United States Patent [19]

Sarracino

[11] Patent Number: 4,609,509

[45] Date of Patent: Sep. 2, 1986

[54] PROCESS AND APPARATUS FOR VULCANIZING THE INSULATION OF AN ELECTRIC CABLE

[75] Inventor: Marcello Sarracino, Milan, Italy

[73] Assignee: Societa' Cavi Pirelli S.p.A., Italy

[21] Appl. No.: 654,532

[22] Filed: Sep. 25, 1984

Related U.S. Application Data

[63] Continuation of Ser. No. 472,768, Mar. 7, 1983, abandoned.

[30] Foreign Application Priority Data

Mar. 16, 1982 [IT] Italy .................... 20171 A/82

[51] Int. Cl.⁴ .................................... B29C 35/06
[52] U.S. Cl. ........................ 264/38; 264/39; 264/102; 264/174; 264/236; 264/237; 264/346; 264/347; 264/348; 425/68; 425/71; 425/73; 425/509; 425/113; 425/325; 425/384; 425/445
[58] Field of Search ............ 264/236, 347, 174, 346, 264/348, 237, DIG. 78, 102, 40.6; 425/71, 68, 325, 73, 113, 509, 384, 210, 445, 404

[56] References Cited

U.S. PATENT DOCUMENTS

| | | | |
|---|---|---|---|
| 2,635,293 | 4/1953 | Prance | 264/178 R |
| 3,229,445 | 1/1966 | Kraft | 264/102 |
| 3,909,177 | 9/1975 | Takaoka et al. | 264/236 |
| 4,029,450 | 6/1977 | Caser | 425/71 |
| 4,179,256 | 12/1979 | Tomioka et al. | 425/71 |
| 4,247,271 | 1/1981 | Yonekura et al. | 264/236 |
| 4,353,861 | 10/1982 | Caser | 264/236 |
| 4,356,143 | 10/1982 | Hill et al. | 264/236 |

FOREIGN PATENT DOCUMENTS

| | | | |
|---|---|---|---|
| 2005235 | 8/1971 | Fed. Rep. of Germany | 264/347 |
| 2603809 | 8/1977 | Fed. Rep. of Germany | 264/236 |
| 46-11570 | 3/1971 | Japan | 425/71 |
| 2038342A | 7/1980 | United Kingdom | 264/174 |

*Primary Examiner*—Jeffery Thurlow
*Attorney, Agent, or Firm*—Brooks Haidt Haffner & Delahunty

[57] ABSTRACT

A process and apparatus for the vulcanization of the insulation of an electric cable in which the cable core with the insulation thereon are passed through a tube filled with a liquid having a specific weight substantially equal to the specific weight of the insulation. The section of the tube nearer the entrance end is supplied with degassed liquid at vulcanizing temperature and the following section is supplied with degassed liquid at a temperature for cooling the insulation, and because the liquid has different viscosities at the two temperatures, a liquid interface is produced between the two portions which interface is maintained during the vulcanizing of the insulation. During the vulcanizing of the insulation, a portion of the liquid in at least one section is removed and treated to remove vulcanization products.

13 Claims, 4 Drawing Figures

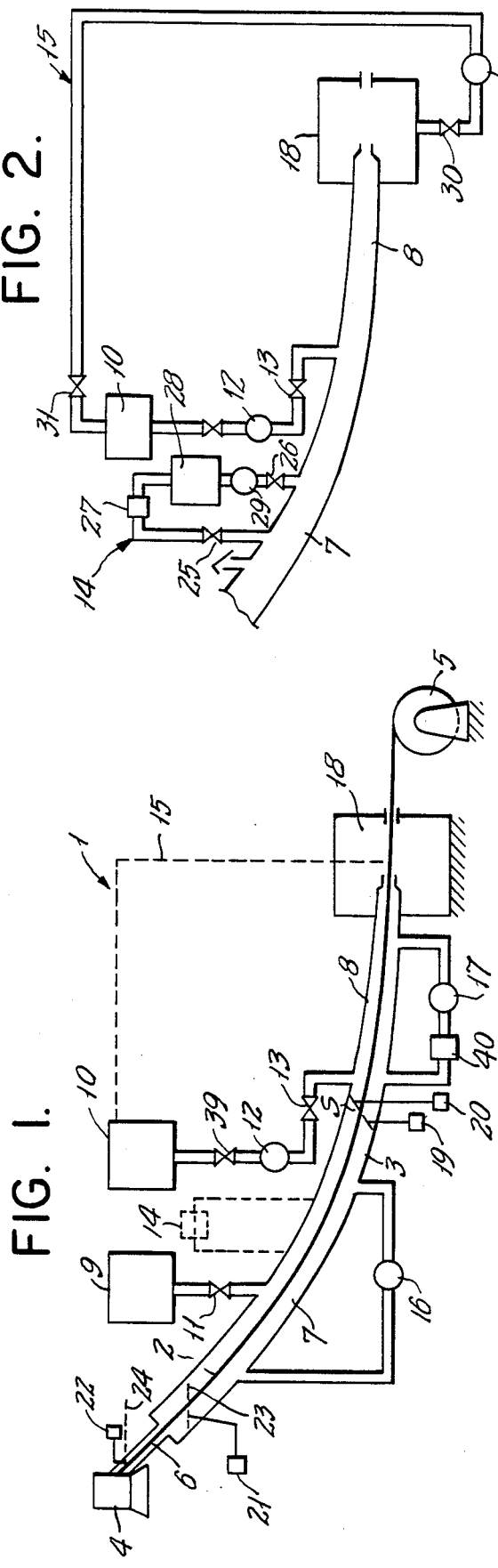
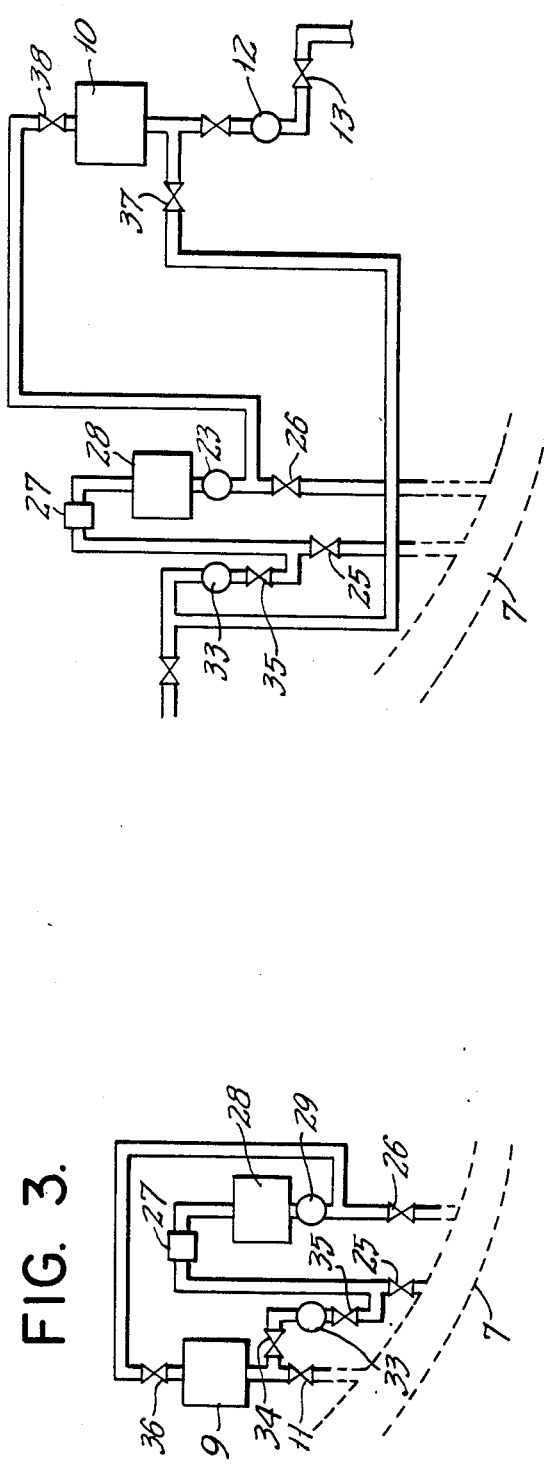

PROCESS AND APPARATUS FOR VULCANIZING THE INSULATION OF AN ELECTRIC CABLE

This application is a continuation of application Ser. No. 472,768, filed Mar. 7, 1983 now abandoned.

The present invention relates to a process and to apparatus for the continuous vulcanization of an electric cable comprising, principally, a central core and insulating material extruder around the core, for example, cross-linkable polyethylene.

More particularly, the invention is intended for vulcanizing an electric cable made to pass, immediately after the extrusion of the insulation material on the core, through a catenary-shaped curing-tube, which is filled with a single pressurized liquid contained in a first section, intended for the heating of the cable insulation, followed by a second section that communicates directly with the first and which is intended for the cooling of the insulation itself.

The liquid contained in the two sections, will be identified hereinafter by the terms "warm" or "cool" which are used according to whether or not it is at a high temperature for transmitting heat to the cable and for causing the cross-linking of the insulation or at a low temperature for cooling the insulation.

In "known" processes and in traditional vulcanization plants, recourse is had to utilizing different fluids in the curing-tube, for example, steam in the heating phase, and water in the cooling phase, and sometimes, for example, a gas, in place of steam.

The prior art curing systems present various drawbacks due mainly to, on one hand, the penetration of steam into the insulation with the consequent successive formation of unacceptable microvoids, and, on the other hand, due to the inability of the gaseous fluid used in the heating tract, to resist the formation of insulating mass which is eccentric owing to its weight, in particular, the insulating material of medium and high tension cables.

Other processes are also known, and such processes act through the utilizing of other liquids, such as, for example, melted mixtures of salts, or metal alloys based on lead, tin, or bismuth. These systems are mixed, i.e. they comprise a first liquid in the heating section, for example, a mixture of fluid salts or an alloy of the metals cited above, and a second liquid in the cooling section, for example, water.

Nevertheless, even though these solutions solve some of the drawbacks cited previously, they bring about other drawbacks. In fact, the usage of melted salt mixtures or melted metallic alloys having a specific weight usually higher than that of the insulating mass can cause, when used in a catenary curing-tube, floating forces upon the insulation which produces negative effects on the eccentricity, the forces being directed upwards.

Moreover, the combined effects of an excessive floating force and of the force due to the pressure in the tube, can cause the shifting of the cable axis from its theoretical configuration, with a consequent risk of forcing the insulating mass, just extruded and not yet solidified, to slide along the walls of the heating section of the curing-tube thereby causing damage. Moreover, all the vulcanizing systems which use a heating fluid different from that of the cooling fluid can present various complications during operation, either because of the various means of retention or of the treatment required for the two fluids, or because of the need to eventually provide barriers between the two fluids for annulling the negative effects that one could exercise on the other.

For overcoming all these previous drawbacks, one can envision the adoption (in the curing-tube) of a single liquid as a fluid both for carrying the heat to the cable during the heating phase as well as for carrying away the heat from the cable during the cooling phase, by providing, at the same time, appropriate characteristics for said liquid. Specifically, such characteristics are:

a specific weight of a value substantially the same as that of the insulating material, so as to realize forces appropriate for resisting the tendency of the insulating mass to become distributed eccentrically;

a compatibility of the liquid with the insulating material, in such a way as to prevent, during any penetration of the liquid into the insulation any deterioration of the dielectric characteristics;

a viscosity of the liquid chosen in such a way that the differences in viscosity, due to the diverse temperatures in the first and in the second sections, allows for said liquids (warm and cool) to be in direct contact in a predetermined zone of the vulcanizer, without any substantial reciprocal intermixing taking place, even in the absence of partition walls in-between the two sections.

One possible example of the use, in a curing-tube, of a liquid that has the characteristics set forth hereinbefore may be found in U.S. Pat. No. 3,909,177.

However, the teaching of this patent is limited to the use of a liquid, in particular, siliconic-oil, in a curing-tube, solely with a horizontal disposition and provided with a watertight end seal at the extremity determined by the freezing of the liquid itself.

The text of the cited patent, does not provide any teachings regarding the modes and the means for a carrying out of the operations of preparing the apparatus for curing, of the setting-up and of the functioning of the apparatus, in which there is a leak at the end, or of the treatment of the liquid utilized as a carrier of heat as it flows into and from the curing-tube.

As can be understood from what has been stated hereinbefore, there are several problems that have to be solved simultaneously for achieving an optimum and complete solution. In fact, in industrial production, it is necessary to put the apparatus into a steady state condition, in the briefest time possible, between one cycle, where one cable has been vulcanized, and the next cycle, where another cable has to be vulcanized. Unfortunately, the solution to this problem is greatly complicated by the length of the curing-tube itself, which is usually more than 100 meters long and for which reason even the operations preliminary to the vulcanizing as such, tend to require long periods of time.

It is also necessary to guarantee the passage of the volatile substances, originating from the vulcanization of the insulating mass, into the liquid, but even here, the solution of the problem is more difficult than one would imagine it to be because the chemical-physical characteristics of the said liquid, from the beginning to the end of the vulcanization, can change causing the liquid to be saturated with the vulcanization products with the consequence of negatively influencing the dielectric characteristics of the insulation.

Also, what cannot be overlooked, in obtaining an optimum solution, is the problem of the heating and the cooling of the end part of the cable that, when the process is stopped remains inside the curing-tube.

It is evident that the solution to this latter problem cannot be overlooked, since the various end portions of the cable, in a continuous industrial production, have length values attaining various hundreds of meters.

The problem can be solved by stopping the cable, and shifting the cool liquid of the second section into the first section, where the vulcanization of the cable portion in question has just taken place. However, even the solution just indicated appears to be impractical. When one observes the known state of the art shown in the cited patent, it is not possible to comprehend with what means it would be possible to shift the cool liquid (existing in the second section of the tube) toward the first section of the tube, and, in particular, where it would be possible to collect the said warm liquid of the first section in order to make room for the said cool liquid.

Hence, one object of the present invention is a process and apparatus for the vulcanization of an electric power cable having an extruded insulation which is made to pass through a catenary-shaped curing-tube, which process and apparatus do not have any of the cited drawbacks.

The principal object of the present invention is a process for the continuous vulcanization of an electric cable having an extruded insulation place around the central core, said process comprising the step of causing the cable to pass, upon its emerging from an extruder, through a catenary-shaped curing-tube which is filled with a single pressurized liquid contained in a first heating section, followed by a second section for the cooling of the insulation, said liquid having a specific weight equal, substantially, to that of the cable insulation and having a difference of viscosity, between the warm and the cool liquids, such that the liquid of the first and the second tracts are in direct contact, in a predetermined zone of the tube, without any significant reciprocal mixing and said warm and said cool liquids being forced into circulation inside each of the two said sections. Said process being further characterized by the fact of comprising, prior to the vulcanization of the cable insulation, the steps of:

(a) sending the cool liquid contained in a first tank, said liquid being already degassed and also being at working temperature, into the cooling section of the curing-tube;

(b) causing the liquid to continually emerge from the second section, with a flow dependent upon the inevitable leakage present at the end of the water-tight sealing elements of the curing-tube and from a controlled exit, while maintaining the level of the cool liquid itself, at a fixed value in a zone between the first and the second sections and while integrating, by a predetermined feeding of the cool liquid introduced into the second section, said leakage and said controlled exit;

(c) sending the warm liquid, which is already degassed and at working temperature and which is contained in a second storage tank, into the heating tract of the curing-tube;

(d) proceeding to vulcanize the cable, while causing the exiting of said cool liquid which is integrated with said predetermined feeding of cool liquid;

(e) during the phase (d), degassifying the liquid.

Accordingly, the process of the invention is based upon the setting into operation of independent and successive phases, for the introduction of a single liquid into the two sections of the curing-tube for the heating and for the cooling of the cable insulation, in the continuous treatment of the liquid during the vulcanizing of the insulation, in the continuous feeding of the liquid in only the second section of the curing-tube for compensating for the leakages and the controlled exiting at the outlet end of the curing-tube.

As can be understood, the process described is quite surprising since, when employing the same liquid in both of the two sections in the curing-tube, there would have had to be expected a recourse to a single feeding phase for the liquid by a single storage tank which is clearly taught in the described prior art.

The duplicate feeding, according to the invention, permits the introduction into the curing-tube, respectively, into the heating and the cooling sections, warm liquid and cool liquid, which are both already degassed and already at working temperatures.

The time necessary for putting into a steady state condition the vulcanizing process of the invention, is considerably reduced and is limited to the time strictly necessary for the step of filling the curing-tube.

The advantage, with respect to the process in which the liquid is introduced into the tube after its having been taken from a single tank, is evident.

With this solution, there is in fact, eliminated the considerable time required in the instance of one feeding alone, for heating and for cooling, the liquid directly inside the two single sections of the tube, each one of which usually having a length of 50 meters and more.

It is moreover comprehensible how the process allows for the immediate formation and maintenance of a zone of separation in-between the warm liquid and the cool liquid without any means of separation existing between said heating and cooling sections in the curing-tube.

In fact, the step of taking up to quite diverse temperatures, one from the other, followed by the step of first introducing the cool liquid and then the warm liquid into the curing-tube, and by the further step of proceeding with the leakage-compensation of the cool liquid that issues from the curing-tube, by causing cool liquid to flow from the associated storage tank towards the second section of the curing-tube, are characteristics that all contribute, in combination with each other, to determining and to maintaining the difference in viscosity that is necessary for a direct contact, at a stationary position in the curing-tube, between the opposite faces of the liquid existing in the two sections of said curing-tube.

The process is moreover carried out with such steps as to guarantee the maintaining of the optimum dielectric characteristic of the insulating mass.

In fact, the warm and cool liquids coming from the two storage tanks, have already been accurately degassed, and there are also provided further continuous degassification of the liquid during operation in such a way as to maintain the liquid in an unsaturated state with respect to the volatile products, i.e. capable of absorbing these volatile products expelled from the insulating mass during the vulcanization step.

It must be pointed out that it is more important to have the degassing of the warm liquid, since in the heating step, volatile substances are liberated. The degassing of the cool liquid guarantees its capacity for absorbing the gaseous products in the vicinity of the first section (of heating). This degassing can, however, be carried out at lower values than what is required in the instance of the warm liquid. Hence, the fact of utilizing two storage tanks is advantageous because it allows for a differential treatment as between the warm and the cool liquids.

As far as the degassing of the liquid is concerned, during the vulcanizing process, the invention permits the intervention of two degassification circuits.

Preferably, therefore, the process is characterized by the fact of comprising, during the vulcanizing, the following steps:

drawing, with continuity, warm liquid from the heating section with a delivery capacity corresponding to a predetermined fraction of the flow capacity of warm liquid passing through the heating section;

causing said warm liquid to circulate inside a degassing circuit parallel and external to the curing-tube;

introducing said already degassed liquid into the heating section, at the vulcanizing pressure existing in the section itself, in such a way that in the vulcanizing cycle the warm liquid in the curing-tube is always able to absorb the volatile substances coming from the cable insulation.

Moreover, for the step of compensating cool liquid losses and the controlled emission of liquid exiting from the curing-tube with liquid coming from a storage tank separate from the warm liquid tank, it is possible to carry out a degassing of the liquid in the second section.

In this instance, the process is characterized by the fact of comprising, during the vulcanization, the steps of:

drawing out cool liquid that exits from the curing-tube and sending it to the upper part of said second storage tank maintained under vacuum, in such a way that when said liquid drops (owing to gravity) from the upper part to the lower part of the storage tank, it undergoes an effect that is equivalent to a degassing before it is introduced into the cooling section of the curing-tube.

What also forms a further object of the invention, is apparatus for the continuous vulcanization of an electric cable with an extruded insulation comprising an extruder sealingly connectable to a catenary-shaped curing-tube, said curing tube comprising a first, heating section, followed by a second, cooling section, said two sections being filled with the same liquid having a specific weight which is substantially equal to the specific weight of the insulating material and which has a difference of viscosity, between warm and cool liquids, such that the liquid in the first section and the liquid in the second section may be in direct contact, in a predetermined zone of the tube, without any significant reciprocal mixing between them. Said apparatus also comprising means for the forced circulation of the warm and the cool liquids, associated with the heating and cooling means present in each of said two sections, said apparatus also being characterized by the fact of comprising a first storage tank containing warm liquid at the working temperature in the curing-tube, and a second storage tank containing cool liquid at the working temperature in the curing tube, means for degassing the liquid, said first storage tank being connected to the heating section with a first on-off valve, and said second storage tank being connected to the cooling section through a pump and an associated second inflow valve.

Other objects and advantages of the present invention will be apparent from the following detailed description of the presently preferred embodiments thereof, which description should be considered in conjunction with the accompanying drawings in which:

FIG. 1 is a schematic, side view, partly in section, of apparatus of the invention;

FIG. 2 is a view similar to FIG. 1 illustrating the apparatus for degassing the liquid during vulcanization of the cable insulation; and FIGS. 3 and 4 are schematic drawings of the apparatus for degassing the liquid prior to vulcanization of the cable insulation.

The apparatus of the vulcanizing plant 1 of FIG. 1 will be described in relation to the vulcanization of an electric cable 2 comprising a conductor or a group of electrical conductors forming the cable core, and an insulating covering placed around the core by extrusion, such covering being made of a plastomeric or elastomeric, cross-linkable material, for example, polyethylene.

The plant 1 comprises a curing-tube 3 having a catenary-shape, at least in the first section, and extends between an extruder 4 and a collecting bobbin 5 for the cable. In FIG. 1, there has been shown a single extruder. However, as is known, the number of extruders could be greater, depending upon the number of layers required for covering the cable core.

Upstream of the extruder 4, there is a pay-out bobbin (not shown) for the cable core and known pulling means (not shown). Downstream of the tube 3, in advance of the collecting bobbin 5, there are further pulling means (not shown) of a conventional type.

For simplicity's sake, FIG. 1 illustrates only the elements necessary for the further explanation of the invention.

The tube 3, is sealingly connectable to the extruder head, with a telescopic conduit 6 of a known type, and the tube 3 has a first and a second section (7,8) identified, respectively, as the "heating" section and the "cooling" section, such sections 7 and 8 being for the cross-linking of and for the solidifying of the insulating mass. The first section 7 is catenary-shaped, and the second section 8 is generally rectilinear.

The fluid, which is the carrier of heat to the cable insulation in the first section and the carrier of heat from the cable in the second section, is a single liquid with a specific weight substantially equal to that of the insulating material, and with a difference in viscosity between warm and cool states, such that the liquid in the first and in the second sections are in direct contact, in a predetermined zone of the curing-tube, without any significant reciprocal mixing. The selected liquid, according to an example, can have a specific weight of between 0.9 and 1 gr/cm$^3$.

For the purpose of simplicity, in FIG. 1, the zone between the two sections, is represented with a single line "S", even though, in reality, the zone of separation has a certain length along the axis of the tube 3.

The liquid is collected initially in first and second storage tanks 9 and 10, both under vacuum. The tank 9 is connected to the first, heating section, by means of a first "on-off" valve 11, and the tank 10 is connected to the second, cooling section through a pump 12 by way of an in-flow valve 13.

In the example illustrated in FIG. 1, it is assumed that the position of the storage tank 9 with respect to the first section 7 is such as to permit the flow of liquid into the section 7 by gravity. In different circumstances, the supply of liquid to the section 7 can be done through the means of a pump.

To give a concrete example, one can assume the use, as a liquid, of silicone-oil with which the two storage tanks 9 and 10 have already been filled, at working temperature.

The plant 1 comprises means for degassing the warm and cool liquids during the vulcanizing phase. These means (14,15) for simplicity's sake, are indicated only schematically, with a broken line in FIG. 1, and they will be explained in more detail further on in this description.

Associated to the curing-tube 3, there are two distinct circuits for the circulation of the warm and the cool liquids, which are effectuated by means of two pumps 16 and 17.

The circulation of the warm liquid is carried out at high velocity and in such a way that a turbulent state ensues which is favorable to the transfer of heat to the cable insulation. Even for the section 8, the liquid can be under forced circulation in such a way as to have a high velocity, determined, naturally, by the viscosity of the liquid itself.

The plant 1 also comprises a plurality of sensors acting, in sequence and in substitution one for the other, on the opening of the in-flow valve 13.

In fact, according to one characteristic of the plant, silicone oil is caused to flow, with a constant delivery, from the second section 8 towards a storage tank 18, while a similar volume of silicone oil is drawn (through pump 12) from the storage tank 10 and supplied to the second section by means of the in-flow valve 13.

The sensors are four in number (19,20,21,22), and have the function of maintaining the separating line, between the first and the second sections in a fixed position during the filling of the curing-tube 3 and in the vulcanizing phase. The first two sensors are applied in proximity to the line separating the warm and the cool liquids, and the third sensor and the fourth sensor are applied in proximity to the upper extremity of the curing-tube in correspondence to the two levels 23,24.

The first, the third and the fourth sensors, give warning of any variation of the liquid level in the tube relative to a gaseous fluid overlying the liquid. The second sensor gives warning of any temperature variations with respect to a predetermined zone between warm and cool liquids.

The circuits for degassing the liquid will be described in connection with the details illustrated in FIG. 2. FIG. 2 omits, for the sake of simplicity, the parts of FIG. 1 which are extraneous to the degassing circuits. The circuit 14 for degassification of the warm liquid (FIGS. 1 and 2) is connectable in parallel, outwardly of section 7, with two valves (25,26), and it comprises heating means 27, a degasser 28, under vacuum, and an inlet pump 29.

The degasser 28, is of a known type appropriate for removing, from the liquid, the volatile substances absorbed from the insulating mass during the phase of vulcanization. In general, the degasser 28 is based upon the principle of dispersing the liquid itself upon a large surface, for facilitating, through the formation of thin layers of liquid, the giving off of the gaseous products. For this purpose, there can be utilized suitable rings which are specially used in this field. The heating means 27 can be of any desired type. For example, it may be electrical resistance units capable of maintaining the fluid at the temperature of vulcanization and of aiding the degassing process. The circuit 14 is dimensioned in such a way as to cause the circulation of a fraction of the fluid delivered to and passing through the section 7, and in such a way as to always maintain the liquid in a condition for absorbing the volatile substances resulting from vulcanization.

The delivery rate of flow of the degasser is dimensioned in such a way as to correspond, for example, to two or three times the volume of the liquid in the first section 7.

The degassing circuit 15 for the cool liquid is connectible through two valves 30,31 respectively, to the tank 18 placed at the exit of the curing-tube 3 and to the storage tank 10, and it comprises a pump 32 for extracting the cool liquid discharged into the storage tank 18 and for introducing the same liquid into the storage tank 10.

The plant comprises further degassing means employed, during the conditions preliminary to the vulcanizing itself, for dealing separately with the fractions of warm liquid and cool liquid prior to their entry into the two sections 7,8 of the curing-tube 3.

In the preferred embodiment, the further means for the preliminary degassing of the warm liquid, comprises a good part of the circuit 14 used during vulcanizing which is advantageous from a plant cost standpoint. The whole circuit is indicated in FIG. 3, where, for the purpose of simplicity, those parts of the plant that are not strictly concerned with the problem of degassing are omitted. This circuit comprises, in series with each other, the storage tank 9, a pump 33 between two on-off valves 34,35, the heating means 27, the degasser 28, the pump 29 and a valve 36 at the entry of the storage tank 9.

The means for the preliminary degassing of the cool liquid can be of many different types. In the preferred embodiment, and quite advantageously, said means utilizes part of the circuit of FIG. 3 as can be seen in FIG. 4 from which there are omitted those parts of the plant that are not concerned with the problem of degassing the cool fluid.

The circuit, for the preliminary degassing of the cool liquid, comprises in series with each other, the storage tank 10, an on-off valve 37, the pump 33, the valve 35, the heating means 27, the degasser 28, the pump 29 and the valve 38 at the entry of the storage tank 10.

As an alternative to the foregoing, by availing of an auxiliary storage tank, the degassing could be effectuated, for example, by drawing the oil from the storage tank 9 and by sending it, after its degassing, into the auxiliary tank. The plant may employ still further known heating means and cooling means associated with the two sections of the tube. In particular, the known type of heating means utilized for the first tube section, in addition to the external means 27, contribute to maintaining the temperature of the oil at the desired value for the vulcanization and for initially bringing the metallic mass of tube 3 to a working temperature.

The operation of the plant will now be described. In the steps preliminary to the vulcanization, two storage tanks (9,10) are prepared by filling them with already degassed silicone oil at the working temperatures in sections 7 and 8 of the tube 3. For example, the oil contained in the storage tank 9 is brought up to 200° C., and the oil in the storage tank 10 is brought up to 25° C.

The silicone oil chosen has such characteristics as to have at these two cited working temperatures, a viscosity in the range from 20 to 40 centistokes at 200° C. and about 300–400 centistokes at 25° C.

Preferably, however, the ratio of viscosity between the liquid for the first section to the viscosity of the liquid for the second section is approximately 1 to 10.

In general, the silicone liquid previously selected can have a viscosity of not less than 150 centistokes and not higher than 500 centistokes at 25° C.

The steps indicated, are effectuated with the aid of the circuits illustrated in the FIGS. 3 and 4 and more particularly:

the oil of the storage tank 9 (FIG. 3), with the valves (11,25,26) shut, is caused, by means of pumps 33 and 29, to circulate through the degasser 28 after having been heated by the means 27 to vulcanizing temperature;

the oil of the storage tank 10 (FIG. 4), with the valves (34,39,25,26) shut, is caused to circulate in the same circuit that was already used for the warm oil, and hence, it is present in the storage tank 10 at a high temperature which does not correspond to that of the working temperature in section 8 of the tube 3. This latter condition is desired in the operation described since a good degassing is favored when the oil is in a low viscosity condition which corresponds to a high temperature.

Successively, the oil of the storage tank 10 is brought to the working temperature of the section 8, by cooling it in an approximate manner. For example, it may be cooled by drawing it, with valve 39 open, through the pump 12, and making it circulate in a suitable circuit (not shown) comprising a cooling element at the exit from which it is once again re-introduced, at a low temperature, into storage tank 10.

The refilling of the tube 3 is now proceeded with, according to the sequence indicated hereinbelow:

firstly, through the means of known systems, with an auxiliary cable, a connection is prepared between the turns of the auxiliary cable wound on the bobbin 5 and the part of cable inside the extruder;

next, with the valve 39 open and pump 12 in operation (FIG. 1), oil is drawn from storage tank 10, and said oil is sent into section 8, and into the forced circulation circuit comprising the pump 17, until the predetermined oil level at the upper extremity of the section 8 is reached. During this step, the pump 12 compensates for any losses of oil leaking from the section 8, and the oil level in the section 8 is controlled by the sensor 19. For example, if the sensor is of the electrical capacitive type, when there is an increase in the level of the liquid, the plates of the relative condenser are no longer submerged in a fluid gaseous ambient but are submerged in a liquid, the dielectric of which varies. The sensor controls, with an appropriate signal, the valve 13 reducing its section in such a manner as to reduce the flow of the entering liquid as compared to exiting from the section 8, thereby restoring the upper level of the cool liquid to the predetermined level limit;

successively, the valve 11 is opened allowing warm oil to enter into the first section 7 of the tube 3 until the level 21 below the telescopic conduit 6 is reached. During this step, the pump 12 is always activated for compensating for the losses of cool liquid from the tube 3, while the checking of the line "S" of separation, between the cool and warm liquids, is effected by the sensor 20 which acts upon the opening of valve 13.

The sensor 20, warns of any variations in the temperature of the liquid outside the pre-fixed temperature range.

In one embodiment, the sensor 20 is a thermo-couple, the sensitive elements of which are disposed in the transition zones between the warm and the cool liquids. In practice, upstream and downstream ends of said theoretical line "S" (FIG. 1) defining the subdivision of the same liquid into two parts having different temperatures and viscosities.

At the termination of this step, the adjustment of the in-flow valve 13, is accomplished by the sensor 21, which is intended to give warning of any variations in the level of warm oil from the prefixed limit 23, and consequently, for readjusting the opening of the valve 13.

Said sensor 21 can be of several different types which are considered suitable for being applied in a liquid ambient covered by a gaseous fluid. For example, it may be the capacitive system described previously.

As has already been explained, in this step the refilling of the section 7, with warm oil, is limited up to the level 23 for allowing, quite advantageously, the extruder 4 to start without load since the conduit 6 is not filled. In practice, the operator can extract from the opening of the telescopic conduit 6, portions of plastomeric or elastomeric compound that are unsuited for covering the cable, and thereupon, to proceed manually with establishing the insulating layer which determines the maximum transverse dimension of the cable extremity which must pass successively into the curing-tube 3 at the start of the vulcanizing step.

Immediately after this, further warm, degassed oil is sent into the conduit 6 for filling the telescopic conduit 6 until the level thereof reaches the prefixed level 24.

Quite advantageously, the filling-up of the conduit 6 is accomplished by means of a storage tank (not shown) having an internal volume equal to the quantity of oil required for reaching the higher level 24. Simultaneously, with the previous operation, the line is put into operation, with extracting of the extremity of the cable from the extruder 4 already activated for covering the cable core. Immediately after this, the telescopic conduit 6 is closed, and a gas is introduced over the warm oil. For example, such gas may be nitrogen, at the desired pressure, such as, for example, at 10 atm.

For avoiding an excessive heating of the nitrogen, and consequently, a premature vulcanization of the compound at the extruder head, the nitrogen is made to undergo renewal, in a known manner and in such a way as to maintain it at an approximate temperature.

During this step and the steps which follow, the fixed upper level of warm oil, and consequently, of the separating line "S" in-between warm liquid and cool liquid, is accomplished by the sensor 22 of a type suitable for being installed in an ambient wherein there is a liquid having a gaseous fluid superimposed thereon. For example, the sensor 22 may be a hydrostatic sensor, or else, a floating one.

After the previous steps, there follow the working steps during which warm oil, under forced circulation by the pump 16 gives up its heat to the cable insulation, causing the crosslinking. The cool oil, under forced circulation by the pump 17, and which is made cool by the cooling element 40, continuously removes heat from the insulation, thereby stabilizing it.

During the vulcanizing step, the operations of the separate and continuous purification of the warm and cool oils is carried out by:

One portion of the warm oil, corresponding, for example, to 1/10 of the oil passing through section 7, is made to circulate in the degassing circuit of FIG. 2, arranged in parallel position to section 7. This circulation is selected so that in the whole period required for vulcanizing the entire cable, all the warm oil is always maintained in a condition in which it is not saturated by the volatile substances emitted from the insulating mass wherein they originate during the vulcanization process.

This latter operation is particularly advantageous because the continous circulation in the degasser of only a fraction of the total oil passing through the section 7, permits the use of a degasser whose dimensions, and the relative cost of which, have low values as compared to those of a degasser required for purifying all the oil passing through the section 7.

In the purifying process indicated, the oil (being pressurized in section 7) passes directly (see FIG. 2) into the degasser 28 operating under depressurization conditions, and it is then introduced, through the pump 29 and at the pressure existing therein into the section 7.

Still advantageously, before its arrival at the degasser 28 itself, the oil is heated by the heating means 27, the action of which, combined with that of the usual heating means normally provided around the tube 3, permits maintaining the oil at the temperature necessary for having a correct crosslinking of the insulating mass.

The cool oil, which emerges from the tube 3, is cyclically collected, under control of a floating control means, from the bottom of the container 18, and by means of the pump 32, it is introduced into the upper portion of the tank 10. The oil, in dropping downwards in the tank 10, disperses a part of the volatile substances that are normally present, and it is then put into use again, in section 8, by means of the pump 12.

In practice, there is obtained a certain amount of degassing of the cool oil in such a way as to assure, particularly in proximity to the separation line "S" between the warm and the cool liquids, a capacity of the oil to absorb volatile substances coming from the insulating mass.

The solution presented, as will be understood from the explanation of the plant and also its relative functioning which has been given, allows for the maintaining of the cool and the warm liquids in the tube 3 in an unchanged position due to the actions of the various sensors acting upon the valve 13, from the preliminary steps of filling the tube 3 with liquid until the vulcanizing steps.

The advantages obtained are believed to be evident. The sensor 19, in carrying out its control through the valve 13, over the delivery by the pump 12, prevents (during the filling phases) any shifting of the cool liquid beyond the prefixed limits and hence, eliminates any long and laborious steps for positioning said liquids in the end section of the tube 3. In practice, there is the advantage of speeding up the putting of the plant itself into a steady state working condition.

Moreover, the various sensors, in their successive and programmed action, prevent any anomaly in the functioning, such as, for example, a shifting of the cool liquid beyond the appropriate section with consequent invasions of the section reserved for warm liquid. As can be comprehended, the occurrence of this situation would bring about a lower speed in the passage of the cable through the curing-tube in order to permit a sufficient cross-linking of the insulating mass in a heating tract which has, upon such occurrence, become in effect, of a shorter length because of the invasion of the section 7 by the cool liquid.

Therefore, the invention brings about the advantage of assuring a manufacturing cycle within the planned time.

What is also included among the characteristics of the invention is the vulcanizing, with the line at rest, of the end portion of cable that remains in the curing-tube.

The process comprises the step of cross-linking the insulation contained in the first section 7, and immediately after this, the emptying of the warm oil from the section 7 into the storage tank 9.

The step of emptying, takes place through a circuit (not shown) wherein a hydraulic connection is established between the upper part of the tube 3 and the upper portion of the tank 9 through a flow control valve. As an alternative to this, said emptying phase can take place subsequent to the opening of the valve 11 (FIG. 1). Due to the effect of the pressure to which the liquid is subjected in the section 7, and due to the empty condition of the storage 9 is found, the oil will flow into the tank 9. As a result of the emptying, the oil descends below the level 24, forcing the sensor 22 to open the valve 13 for causing the cool oil to flow out from the second section 8 towards the first section 7.

In this phase, the action of the pump 12 is continuous, and gradually, the cool oil, in pushing out the warm oil into the storage tank 9, occupies the section 7 and takes the heat away from the insulating mass of the cable with a consequent consolidation thereof. Successively, the line is once again put into operation for extracting the end portion of cable from the curing-tube 3.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. In a process in which insulation which generates vulcanization products during vulcanization is extruded around a cable core and the core with the insulation therearound is continuously fed into the entrance end of a tube for vulcanizing the insulation and is continuously removed from the opposite, exit end of the tube, said tube having two sections filled with degassed liquid under pressure, said liquid having a specific weight substantially equal to the specific weight of the insulation, the portion of the liquid in the first of the two sections being at vulcanizing temperature and having a first viscosity and the portion of the liquid in the second of the two sections being cooler than and having a viscosity different from respectively, the temperature and viscosity of the liquid in said first section to provide a liquid interface between the first and second sections which avoids significant reciprocal mixing of the liquid in the first and second sections, and a portion of the liquid in said first section being circulated therein and a portion of the liquid in said second section being circulated therein, the steps of:

supplying degassed said liquid at the temperature in said second section to said second section until it reaches the level of said interface;

maintaining said liquid in the second section at the level of said interface by continuing to supply the liquid to the second section at a rate which will compensate for losses of the liquid at the exit end of said tube;

supplying degassed said liquid at the vulcanizing temperature to said first section;

after the liquids have been so supplied to the sections, continuously feeding the insulation covered core through the sections to vulcanize and cool the insulation;

during the vulcanizing and cooling of the insulation as the cable passes through the sections, continuing to maintain said interface by continuing to supply the liquid to said second section; and while the cable is being passed through the tube and so treated in the sections, removing at least a portion of the liquid at vulcanizing temperature in the first section and a portion of the cooler liquid in the second section, removing from each of the portions of the liquid removed from the first and second sections products generated during the vulcanizing of the insulation and after removal of at least a portion of said products from the liquid from said first section, returning the latter liquid to said first section, after removal of at least a portion of said products from the liquid from said second section, returning the latter liquid to said second section, the rate of removal of liquids from the first and second sections, the rate of removal of said products from the liquids and the rate of return of the liquids to said sections being selected to prevent saturation of the liquids in said sections by said products while the cable is being passed through the tube.

2. Process as set forth in claim 1 wherein there is an extruder connected to the input of said tube by a conduit further comprising:

prior to feeding the insulation covered core through said sections, degassed said liquid at the vulcanizing temperature is supplied to said second section up to a level which leaves at least a portion of said conduit unfilled;

prior to feeding the core into said tube, insulation is applied to the core within said conduit;

after the core has insulation applied thereto, said portion of said conduit is filled with degassed said liquid at vulcanizing temperature;

after said conduit is filled with said degassed liquid, feeding said core from said conduit through said tube; and supplying a gas under the pressure of the liquid between said extruder and the liquid in said conduit.

3. Process as set forth in claim 1 wherein at least said first section of said tube has the shape of a catenary.

4. Apparatus for the continuous production of a cable having a core covered by vulcanized insulation, said apparatus comprising:

an extruder for extruding insulation around said core, said insulation being of a type which generates gasses during vulcanization;

a vulcanizing tube for receiving said core covered by insulation;

means connecting said extruder to one end, an input end, of said tube in fluid-tight relation thereto;

a liquid having a specific weight substantially equal to the specific weight of said insulation in said tube, the portion of said liquid in a first section of said tube nearer said extruder having a vulcanizing temperature and the portion of said liquid in a second section of said tube more remote from said extruder than said first section having a lower temperature and a viscosity different from the viscosity of the liquid in said first section of said tube to provide a liquid interface between the liquid in said first section and the liquid in said second section;

a first storage tank containing said liquid at said vulcanizing temperature;

first circulatory means for circulating said liquid in said first tank between said first tank and said first section, said first circulatory means comprising degassing means for removing gas from the liquid circulated between said tank and said first section at a rate which prevents saturation of the liquid in the tube by said gasses while said core is in said tube;

a second tank containing said liquid at said lower temperature; and second circulatory means for circulating said liquid in said second tank between said second tank and said second section, said second circulatory means comprising degassing means for removing gas from the liquid circulated between said second tank and said second section at a rate which prevents saturation of the liquid in the tube by said gasses.

5. Apparatus as set forth in claim 4 further comprising sensor means at said interface for controlling said means for circulating said liquid in said second tank and thereby compensating for losses of said last-mentioned liquid from said tube.

6. Apparatus as set forth in claim 5 wherein said sensor means comprises means for sensing the level of said last-mentioned liquid and means for sensing the temperature at said interface.

7. Apparatus as set forth in claim 5 further comprising sensor means adjacent to said extruder for sensing the level of the liquid adjacent thereto.

8. Apparatus as set forth in claim 4 wherein said first circulating means comprises heating means for heating the liquid circulated thereby.

9. Apparatus as set forth in claim 8 further comprising means for connecting said second tank to said heating means and said degassing means of said first circulating means for heating and degassing the liquid in said second tank.

10. Apparatus as set forth in claim 9 further comprising cooling means for cooling the liquid from said second tank after said last-mentioned liquid has been heated and degassed.

11. Apparatus as set forth in claim 8 further comprising a collecting tank at the exit end of said tube for collecting liquid exiting from said tube and means for transferring liquid in said collecting tank to said second tank.

12. Apparatus as set forth in claim 4 wherein said liquid is a silicone oil which has a viscosity at the vulcanizing temperature which is about one-tenth the viscosity thereof at the temperature in said second section.

13. In a process in which insulation which generates gasses during vulcanization is extruded around a cable core and the core with the insulation therearound is continuously fed into the entrance end of a tube for vulcanizing the insulation and is continuously removed from the opposite, exit end of the tube, said tube having two sections filled with degassed liquid under pressure, said liquid having a specific weight substantially equal to the specific weight of the insulation, the portion of the liquid in the first of the two sections being at vulcanizing temperature and having a first viscosity and the portion of the liquid in the second of the two sections being cooler than and having a viscosity different from respectively, the temperature and viscosity of the liquid in said first section to provide a liquid interface between the first and second sections which avoids significant reciprocal mixing of the liquid in the first and second sections, and a portion of the liquid in said first section being circulated therein and a portion of the liquid in said second section being circulated therein, the steps of:

as the cable core with the insulation therearound is fed through the tube, removing a portion of the liquid from the first section, degassing the latter liquid and returning the degassed liquid to the first section, the rate of removal, degassing and return of the latter liquid being selected to prevent saturation of the liquid in the tube by the gasses generated by the insulation while the cable is being passed through the tube; and as the cable core with the insulation therearound is fed through the tube, removing a portion of the liquid from the second section, degassing the latter liquid and returning the degassed liquid to the second section, the rate of removal, degassing and return of the latter liquid being selected to prevent saturation of the liquid in the tube by the gasses generated by the insulation while the cable is being passed through the tube.

* * * * *